United States Patent Office

3,767,592
Patented Oct. 23, 1973

3,767,592
ACTIVATED CARBON FROM PETROLEUM COKE PRETREATED WITH POLYPHOSPHORIC ACID
Joel Kwok, Fullerton, and Alex Miller, Placentia, Calif., assignors to Union Oil Company of California, Los Angeles, Calif.
No Drawing. Filed June 23, 1971, Ser. No. 156,077
Int. Cl. C01b *31/08*
U.S. Cl. 252—423        10 Claims

ABSTRACT OF THE DISCLOSURE

An improved method is disclosed for the production of activated carbon from petroleum coke. In the method, a particulate petroleum coke is pretreated with polyphosphoric acid having an equivalent $P_2O_5$ content greater than 74 weight percent and thereafter contacted with steam at a temperature of from 1300 to 1700° F. for a period sufficient to reduce the weight of said coke by at least 70 weight percent.

DESCRIPTION OF THE INVENTION

This invention relates to the preparation of activated carbon, and more particularly, relates to a method for preparing activated carbon from particulate petroleum coke.

BACKGROUND OF THE INVENTION

Activated carbon is a form of amorphous carbon characterized by a high adsorptive capacity for gases, vapors and colloidal solids. It has been used to adsorb color imparting substances or impurities from liquid solutions and to adsorb toxic and noxious vapors from gaseous mixtures. Currently, the feasibility of using activated carbon for the large scale reduction of air and water pollution through the United States is being investigated.

Activated carbon is commonly produced by the destructive distillation of naturally occurring organic matter such as wood, lignite, coconut shells, peat, etc. However, because of the anticipated large demand of active carbon for removal of atmospheric and water pollutants from the environment, other raw materials and improved methods of activating the raw materials are being investigated.

Petroleum coke is an attractive raw material since it has relatively uniform properties, it is relatively inexpensive and commercially available in large quantities. The production of activated carbon from petroleum coke is not new, and numerous processes have been advanced for its activation. These processes are, in general, high temperature, controlled oxidation processes wherein an oxidant gas or liquid or combination of both is contacted with the coke at elevated temperatures. The processes oxidize the hydrocarbons in the coke without complete oxidation of the carbon to produce a highly porous carbon matrix. Exemplary oxidant gases that have been suggested included steam, flue gas, carbon monoxide, etc.; and exemplary oxidant liquids include sulfuric, nitric, hydrochloric and phosphoric acid.

None of the proposed processes utilizing an oxidant gas or liquid have proved successful or at least commercially competitive with the activated carbon made from naturally occurring organic matter. The most attractive of these commercially unsuccessful processes comprises a combined treatment of coke with steam and phosphoric acid. In this process, the coke is first treated with phosphoric acid to wet the surface of the coke and then the wet coke is contacted with steam at a temperature of between about 1300 and 1700° F. This process has been found to produce a form of activated carbon having a surface area of from 400 to 500 square meters per gram as measured by the sorptometer method. The surface area is indicative of the adsorptive capacity or activity of the carbon with the larger surface area connoting the greater adsorptive capacity. Although the above activation results in a highly active carbon, it is still commercially inferior to those produced from naturally occurring organic matter. Thus a need exists for an improved process for the activation of petroleum coke to an active carbon having an increased adsorptive capacity.

We have found that an improved petroleum coke activation process is realized by pretreating the coke with polyphosphoric acid and thereafter subjecting the acid treated coke to steam at a temperature of from 1300 to 1700° F. The polyphosphoric acid which is employed herein to realize the advantages of this invention must have an equivalent $P_2O_5$ content of at least 74 weight percent. Phosphoric acid having a lower $P_2O_5$ content has been found not to impart the desired adsorptive capacity to the resulting active carbon particles. The steam treatment is conducted for a period sufficient to reduce the original coke weight by at least 70 weight percent. By treating the coke in this manner it is possible to realize an activated coke product having a surface area of from 600–700 square meters per gram, and in some instances greater than 700 square meters per gram.

Although the exact mechanisms of the activation is unknown, it is believed that the polyphosphoric acid cooperates in a synergistic manner with the steam in effecting controlled oxidation of the coke. The employment of orthophosphoric acid rather than polyphosphoric does not exhibit this synergistic effect since activations with such acid results in activated carbon having an absorptive capacity of less than 500 square meters per gram.

The petroleum coke which can be activated by the method of this invention can comprise any of the commercially available cokes, such as, those prepared by delayed as well as fluidized coking procedures from high boiling coker feedstocks. Exemplary feedstocks include virgin crude, bottoms from the vacuum distillation of reduced crude, thermal tar, Duo-Sol extract, furfural extract, vacuum tar, reduced crude, topped crude and blends thereof. Particularly preferred cokes included are those produced from feedstocks containing a high aromatic content such as the refractory cycle stocks obtained from thermal and catalytic cracking processes and boiling in the gas oil range. Decant oil from fluid catalytic cracking is another example of such high aromatic content feedstocks. The coke produced from the above feedstocks generally have a volatile combustible material content between about 8 and 20 weight percent, however, it is preferred to employ coke in this invention which has a volatile combustible material content between about 10 and 15.

Finely ground coke or coke having large conglomerated chunks yield a low grade activated carbon when activated by the method of this invention. Coke having a particle size capable of passing through a 0.37 inch U.S. Standard Sieve but retained by a 35 mesh U.S. Standard Sieve can be successfully employed in the practice of this invention. Particles having an average diameter between about 4 and 8 mesh are particularly preferred. Those particles having a size less than 50 mesh or greater than ½ inch diameter are undesirable and should be agglomerated or pulverized to the appropriate particle size.

The particle coke is admixed with the polyphosphoric acid solution to wet at least 80 percent of the coke surface area with the acid. This can be accomplished by using an excess of the acid in any of the conventional liquid-solids contactors. Exemplary contactors are described on pages 19–1 to 19–37 of Perry's Chemical Engineering Handbook, Fourth Edition, incorporated herein by reference. The amount of acid employed generally ranges from 0.1 to 5 parts of acid per part of particulate coke. This contacting can be conducted at ambient temperatures for a period of from 1 to 60 minutes, sufficient to wet the surface of the coke. Longer contacting times can be employed where partial oxidation of the coke by the acid is desired. Preferably, the acid contacting is conducted at elevated temperatures such as from 100 to 300° F. to effect faster wetting of the coke surface and also to partially oxidize the particulate coke. After the particles have become surface wet with the acid, the excess acid, if any, is drained off. This can be accomplished by placing the particles in a suitable holding vessel and allowing the excess acid to gravity drain. If gravity draining is found to be too slow for a particular application, centrifugal draining may be employed provided that the resulting wet coke contains at least 0.1 weight percent of polyphosphoric acid and preferably at least 1 weight percent polyphosphoric acid.

In addition to, or in lieu of draining the excess acid from the particles, the coke may be washed with a water solvent to reduce the acid content on the coke surface. This washing step may be conducted by simply admixing the coke with an excess of water and thereafter draining off the water. In instances where a water bath is employed, care must be taken so that at least 0.1 weight percent and preferably 1 weight percent of polyphosphoric acid is retained on the wet coke.

The polyphosphoric acid as employed in this invention can be represented by the general formula:

$$H_{n+2}P_nO_{3n+1} \qquad (1)$$

wherein $n$ is greater than 1.

In highly concentrated solutions such as are encountered in the polyphosphoric acid solutions, $n$ in the above equation has several values. Thus, it is difficult to define the exact chamical structure of the acid. A fairly accurate method for defining the polyphosphoric acid is by determining the equivalent amount by weight of $P_2O_5$ in the acid solution. With this method the above formula can be converted onto the $P_2O_5$ basis as follows:

$$(H_2O)_{[1/2(n+2)]}(P_2O_5)_{[1/2n]} \qquad (2)$$

The percent of $P_2O_5$ in the acid solution for various concentrations of polyphosphoric acid has been determined experimentally and is illustrated in the following Table 1.

TABLE 1

Composition of Strong Phosphoric Acids

| $P_2O_5$ (wt. percent) | Percent of total phosphorus as— | | | | | | | |
|---|---|---|---|---|---|---|---|---|
| | $n=1$ | $n=2$ | $n=3$ | $n=4$ | $n=5$ | $n=6$ | $n=7$ | $n=8$ | Higher |
| 68.8 | 100 | | | | | | | | |
| 70.6 | 95 | 4.8 | | | | | | | |
| 72.4 | 87.3 | 13 | | | | | | | |
| 74.3 | 67.8 | 29.5 | 2.7 | | | | | | |
| 75.9 | 48.9 | 41.8 | 8.2 | 1.1 | | | | | |
| 78.0 | 26.9 | 49.3 | 16.8 | 5.3 | 1.6 | | | | |
| 80.5 | 13.5 | 35.0 | 25 | 14 | 6.6 | 3.1 | 2.8 | | |
| 82.57 | 5.1 | 20 | 16.4 | 16 | 12.6 | 8.9 | 6.4 | 4.1 | 10.5 |
| 86.2 | 1.5 | 3 | 3.3 | 5.1 | 5.3 | 5.5 | 3.5 | 3.3 | 69.3 |
| 88 | | | | | | | | | 100 |

This invention contemplates the use of polyphosphoric acid solutions containing at least 74 weight percent of equivalent $P_2O_5$. At this lower concentration, as shown by the above table, approximately 67 percent of the solution is orthophosphoric acid ($n=1$), 29 percent is pyrophosphoric acid ($n=2$) and 2.6 percent is triphosphoric acid ($n=3$). The preferred acid in this invention has a $P_2O_5$ content of from 74 to 86 weight percent and more preferable from 76 to 82 weight percent.

After the coke particles have been contacted with the polyphosphoric acid they are contacted with steam at a temperature of from 1300 to 1700° F. and preferably from 1450 to 1550° F. It is during this contacting that the coke loses a major portion of its weight through oxidation and forms the porous carbon matrix. Although many steam contacting procedures may be employed herein with good success, we have found that the best results are realized if the coke is heated prior to the contacting with high temperature steam, or alternatively, contacted initially with a lower temperature steam. This preheating step reduces the shattering of the coke particles which occurs when the temperature of the particle is abruptly changed upon initial contact with the hot steam. The steam is passed over the coke at a rate of from about 0.3 to 5 pounds of steam per pound of coke per hour, and preferably from about 0.8 to 1.5 pounds of steam per pound of coke per hour. The steam vaporizes the retained polyphosphoric acid and slowly oxidizes the hydrocarbons as well as a portion of the carbon in the coke particles. The steam contacting is continued for a period sufficient to reduce the original dry coke weight by at least 70 percent and preferably by at least 80 percent. The time required for this weight reduction varies depending upon the type and amount of coke, the temperature of the steam and the type and amount of polyphosphoric acid. Generally, however, the contacting period varies from 5 to 30 hours.

In a preferred embodiment, the acid treated particles are contacted with steam at moderate temperature of from 1400 to 1500° F. for a prolonged period of from 16 to 24 hours.

The process may be operated as a batch or continuous process. In an exemplary batch process, the coke particles are charged into an insulated vessel along with the appropriate amount of polyphosphoric acid. After the particles have become wet with the acid component, the excess, if any, is drained from the vessel. Steam is thereafter passed through the particles to partially oxidize the coke and vaporize the residual phosphoric acid adhered to the coke surface.

It is preferred to employ a continuous processing scheme and more preferably a counter-current continuous process. In this latter process, the particulate coke is continuously fed into a liquid-solids contactor where it is uniformly contacted with the polyphosphoric acid. The wet particles are conveyed from the contactor and discharged into one end of a rotary kiln furnace. Steam is introduced into the furnace at its coke discharge end and passes counter-currently across the coke. The hot incoming steam is at its highest temperature at the coke discharge end of furnace and is at its lowest value at the coke inlet. Thus the coke is initially contacted with a lower temperature steam and its temperature is gradually increased during its travel through the furnace. The incoming hot steam also completely vaporizes any of the phosphoric acid remaining on the coke, and sweeps the phosphorus vapors and other volatile products away from the discharge end and away from the heated activated material. This prevents adsorption of such products by the activated carbon and favors elimination of what may already be adsorbed.

The carbon prepared in accordance with the practice of this invention is capable of being employed in any of the commercial processes which use other activated carbons for adsorption and purification. For example, the carbon can be used for the adsorption of gases and vapors of saturated and unsaturated hydrocarbon such as, adsorption of methane, etc, from the well casings of oil and gas wells, adsorption of toxic gases, the decoloration of liquids, etc.

The following examples are cited to illustrate the results obtainable in the practice of this invention, but should nnot be construed as limiting the scope of the invention as defined by the appending claims.

Examples 1-12

These examples are presented to illustrate the advantages associated with the employment of polyphosphoric acid in combination with steam activation.

In each of the following examples, 50 grams of a green petroleum coke having a mean diameter of from 4 to 8 mesh U.S. Standard Sieve, is charged into a 250 milliliter beaker. The coke had a volatile combustible material content of 13 weight percent. Approximately 50 grams of polyphosphoric acid is then charged into the vessel in contact with the coke particles. The acid-coke mixture is stirred for approximately 10 minutes and then placed on a steam bath at a temperature of 212° F. for approximately 24 hours to wet the surface of the coke. After the 24 hour contacting period, 34 grams of excess acid is drained from the vessel.

Approximately 30 grams of the acid wet coke are charged into one end of a long quartz tube having a one-inch outside diameter and a ¾-inch inside diameter. The end of the quartz tube is covered by a 50 mesh screen to prevent discharge of coke from the end of the tube. Immediately behind the coke within the tube, 6 inches of ¼-inch diameter Alundum balls are charged into the quartz tube. These balls provide a means for converting water into steam for the activation process.

The end of the quartz tube housing the coke and Alundum balls is placed into a Lindberg tube furnace and heated to the activation temperature. Water is injected into the open end of the tube projecting from the furnace at the rate of approximately 1 to 1.5 liters per day for a 24 hour contacting period. At the end of the contacting period, the tube is removed from the furnace and the carbon particles discharged into a holding container and weighed. A reduction in weight of the coke charged to the acid vessel is determined and reported in the following table.

The surface area of the carbon samples is determined by the Sorptometer method. In this method 1 gram of the coke particles is placed in a 5 milliliter glass sample holder. A stream of dry helium at 400° C. is passed through the holder and contained carbon particles for approximately 30 minutes to dry the sample. The introduction of helium gas is terminated and the sample is cooled to room temperature. The open end of the glass sample holder is then connected to a Perkins-Elmer Sorptometer. In the Sorptometer, the sample is contacted with a gas stream of 2 volume percent nitrogen and 98 volume percent helium flowing at a rate of 33 milliliters per minute at room temperature. This contacting is continued and when the thermal conductivity of the effluent gas mixture indicates that nitrogen is no longer being adsorbed by the carbon sample, the sample holder is then plunged into a liquid nitrogen bath to cool the coke to a temperature of −195° C. At this temperature the nitrogen gas is slowly adsorbed by the carbon sample. The temperature is maintained at −195° C. until the thermal conductivity of the effluent gas become stabilized thereby indicating that nitrogen is no longer being adsorbed by the coke.

After equilibrium is reached, the sample is rapidly warmed to room temperature and the amount of nitrogen released during this time is determined by continuously monitoring the thermal conductivity in the effluent gas mixture. The surface area covered by one monolayer of desorbed nitrogen can be calculated by using the B.E.T. equation as follows:

$$\text{Surface area} = \frac{KVa\left(1-\frac{P}{Po}\right)}{W}$$

where:

K is the calibration constant for the apparatus and determined from a sample having a known surface area,
$Va$ is the volume of nitrogen desorbed at standard conditions,
$Po$ is the saturation pressure of nitrogen at −195° C.,
P is the partial pressure of nitrogen in the helium mixture,
W is the sample weight.

The following Table 2 presents the findings from several carbon samples prepared by the method of the invention.

TABLE 2

| Example | Coke sample weight loss (wt. percent) | Activation temperature (° F.) | Acid oxidant | Surface area (m.²/gm.) |
|---|---|---|---|---|
| 1 | 50 | 1,350 | None | 415 |
| 2 | 92 | 1,420 | do | 422 |
| 3 | 56 | 1,420 | do | 409 |
| 4 | 93 | 1,400 | Sulfuric[1] | 556 |
| 5 | 91 | 1,400 | do | 518 |
| 6 | 90 | 1,400 | Hydrofluoric | 520 |
| 7 | 71 | 1,400 | Phosphoric[2] | 477 |
| 8 | 80 | 1,400 | Polyphosphoric[3] | 640 |
| 9 | 93 | 1,400 | do.[3] | 636 |
| 10 | 86 | 1,400 | do.[3] | 636 |
| 11 | 81 | 1,400 | do.[4] | 642 |
| 12 | 80 | 1,400 | do.[4] | 635 |

[1] Fuming sulfuric acid.
[2] Orthophosphoric acid having a $P_2O_5$ content of approximately 72 weight percent.
[3] Polyphosphoric acid having a $P_2O_5$ content of approximately 76 weight percent.
[4] The coke treated with the acid from Example 8 is washed with water after contacting with polyphosphoric acid to reduce the acid retained by the coke to approximately 0.9 weight percent.

Example 13

This example illustrates the practice of this invention in activating coke by continuous processing. A particulate green coke capable of passing a 4 mesh screen but retained by a 8 mesh screen U.S. Standard Sieve and having a VCM content of about 12 weight percent is discharged onto a continuous belt conveyor. The conveyor transports the coke to the feed hopper of a 5 cubic foot standard muller mixer rate of about 25 pounds per minute. The mixer is operated at 20 r.p.m. with a 2 horsepower electric motor. Polyphosphoric acid is injected into the mixer at the rate of 25 pounds per minute. The mixer uniformly mixes the coke with the injected acid and discharges the wet coke upon a 10 foot long 3 foot wide vibrating 16 mesh Teflon-lined screen slanted at a 20 degree angle. A collection tray is provided below to screen, to collect and recycle the excess acid from the wet coke particles. The acid employed herein has a $P_2O_5$ content of 80 weight percent and is injected into the mixer at about 250° F.

The wet particles fall from the vibrating screen into a tapered 50 gallon Teflon-lined iron hopper having a 3-inch diameter screw conveyor at the bottom thereof. The conveyor forces the wet cake (90 weight percent coke and 10 weight percent acid) into a rotary furnace at the rate of about 28 pounds per hour. The furnace is a 3-foot diameter kiln about 25 feet long and placed on a 2 degree incline. The furnace is rotated at approximately 1 revolution per hour so that the coke residence time in the furnace is approximately 24 hours. Steam at a temperature of approximately 760° C. is injected into the opposite end of the furnace at a rate of about 30 pounds per hour and passes counter current to the coke particles. The steam completely vaporizes the phosphoric acid from the coke so that the carbon exiting the rotary furnace contains no detectable amount of phosphorus. The amount of the coke recovered from the furnace varies from 5 to 7½ pounds per hour which corresponds to about 70 to 80 weight percent reduction of the original dry coke weight.

The absorptive capacity of the carbon product is tested by contacting a 10 gram sample of the activated carbon product with a liquid solution containing 1 gram of methyl orange in 500 cc. of water at 85° C. for 30 minutes. At the end of 30 minutes the solution is completely decolorized.

Although we have illustrated the present invention in connection with specific embodiments thereof, it is not intended that the illustration set forth herein should be regarded as limitations upon the scope of the invention, but rather, it is intended that the invention be defined by the reagents and steps and their equivalents as set forth in the following claims.

We claim:

1. A method for producing activated carbon from particulate petroleum coke which comprises:
   contacting said petroleum coke with polyphosphoric acid having an equivalent $P_2O_5$ content from 76 to about 82 weight percent and containing no more than about 67 percent orthophosphoric acid, the balance being polyphosphoric acid having the formula $H_{n+2}P_nO_{3n+1}$ where $n$ is a whole number integer greater than 1; and
   contacting the acid treated coke with steam at a temperature of from about 1300° to 1700° F. for a period sufficient to reduce the weight of said coke by at least 80 percent.

2. The method defined in claim 1 wherein said coke has a volatile combustible material content of from 8 to 20.

3. The method in claim 2 wherein said coke is contacted with said acid at a temperature of from 100 to 300° F.

4. The method defined in claim 2 wherein the temperature of said steam is from about 1450 to 1550° F.

5. The method defined in claim 2 wherein the coke wetted by said phosphoric acid is contacted with steam for a period of from 1 to 30 hours to reduce the weight of said coke by at least 80 percent.

6. The method defined in claim 2 wherein said coke is contacted with from 0.3 to 5 pounds of steam per pound of coke per hour.

7. The method defined in claim 2 wherein said coke has a particle size of from 0.37 inch to 35 mesh U.S. Standard Sieve.

8. A method for producing activated carbon from petroleum coke which comprises, contacting petroleum coke particles having a mean diameter of from 4 to 8 mesh with polyphosphoric acid having an equivalent $P_2O_5$ content of from 76 to 82 weight percent and containing no more than about 67 percent orthophosphoric acid, the balance being polyphosphoric acid having the formula $H_{n+2}P_nO_{3n+1}$ where $n$ is a whole number integer greater than 1 at a temperature of from 100° to 300° F.; and thereafter contacting the coke particles with steam at a temperature of from 1450° to 1550° F. for about 5 to 30 hours and sufficient to reduce the weight of said coke by at least 80 percent.

9. The method defined in claim 8 wherein said petroleum coke has a volatile combustible material content of from 10 to 15 weight percent.

10. The method for producing activated carbon which comprises contacting petroleum coke particles having a size less than 0.37 inch and greater than 35 mesh U.S. Standard Sieve and having adhered to the surface of the coke at least 1 weight percent of polyphosphoric acid having an equivalent $P_2O_5$ content of from 76 to 82 weight percent and containing no more than about 67 percent orthophoshporic acid, the balance being polyphosphoric acid having the formula $H_{n+2}P_nO_{3n+1}$ where $n$ is a whole number integer greater than 1, with steam at a temperature of from 1300 to 1700° F. for a period sufficient to reduce the weight of said coke by at least 80 percent.

References Cited
UNITED STATES PATENTS

| 1,875,795 | 9/1932 | Zurcher | 252—445 |
|---|---|---|---|
| 2,977,325 | 3/1961 | Feustel et al. | 252—445 |
| 1,819,314 | 9/1931 | Zurcher | 252—445 |
| 3,112,350 | 11/1963 | Bielawski et al. | 252—435 |

DANIEL E. WYMAN, Primary Examiner

P. E. KONORKA, Assistant Examiner

U.S. Cl. X.R.

252—445; 423—460